US010640307B2

(12) United States Patent
Sun et al.

(10) Patent No.: US 10,640,307 B2
(45) Date of Patent: May 5, 2020

(54) SEPARATION MECHANISM AND FEEDING DEVICE FOR MATERIAL TRAY

(71) Applicant: World Precision Manufacturing (Dongguan) Co., Ltd., Dongguan (CN)

(72) Inventors: Jinsuo Sun, Dongguan (CN); Yu Shen, Dongguan (CN)

(73) Assignee: WORLD PRECISION MANUFACTURING (DONGGUAN) CO., LTD., Dongguan (CN)

( * ) Notice: Subject to any disclaimer, the term of this patent is extended or adjusted under 35 U.S.C. 154(b) by 0 days.

(21) Appl. No.: 16/116,684

(22) Filed: Aug. 29, 2018

(65) Prior Publication Data

US 2018/0362271 A1 Dec. 20, 2018

(30) Foreign Application Priority Data

Apr. 9, 2018 (CN) .......................... 2018 1 0312511

(51) Int. Cl.
| | |
|---|---|
| *B65G 59/02* | (2006.01) |
| *B65G 47/91* | (2006.01) |
| *B25J 15/02* | (2006.01) |
| *B65G 61/00* | (2006.01) |
| *B65G 43/08* | (2006.01) |
| *B65G 59/10* | (2006.01) |

(52) U.S. Cl.
CPC .......... *B65G 59/02* (2013.01); *B25J 15/0226* (2013.01); *B65G 43/08* (2013.01); *B65G 47/917* (2013.01); *B65G 61/00* (2013.01); *B65G 59/107* (2013.01); *B65G 2201/022* (2013.01)

(58) Field of Classification Search
CPC ........ B65G 59/02; B65G 43/08; B65G 61/00; B65G 47/917; B65G 59/107; B65G 2201/022; B25J 15/0226
USPC ...... 414/795.4; 294/203, 94, 110.2, 114, 116
See application file for complete search history.

(56) References Cited

U.S. PATENT DOCUMENTS

| | | | | |
|---|---|---|---|---|
| 3,888,341 A | * | 6/1975 | Konkal ..................... | B23Q 1/28 198/345.3 |
| 5,347,928 A | * | 9/1994 | Ito ........................ | B41F 27/1206 101/415.1 |
| 5,348,441 A | * | 9/1994 | Takemasa ............. | B23P 19/001 414/788.7 |
| 5,607,278 A | * | 3/1997 | Mojden .............. | B65G 47/5181 294/116 |

(Continued)

*Primary Examiner* — Lynn E Schwenning
(74) *Attorney, Agent, or Firm* — Shimokaji IP (57) ABSTRACT

A separation mechanism includes a body frame, a clamping mechanism, a lifting assembly, and a material frame. The clamping mechanism includes a driving motor mounted on the body frame, two rotating shafts driven by the driving motor, and at least one clamping assembly. A separation area is formed between the two rotating shafts. The clamping assembly includes a main cam mounted on the respective rotating shaft and a main clamping block following the main cam. The main cams being configured that when the rotating shafts rotate to an initial station, the main cams drive the main clamping blocks to withdraw to release the material tray, and when the rotating shafts rotate to a clamping station, the main cams drive the main clamping blocks to stretch to clamp the material tray. A feeding device is also provided, which is simple in structure, small in size, and convenient to control.

8 Claims, 8 Drawing Sheets

(56) References Cited

U.S. PATENT DOCUMENTS

| | | | | |
|---|---|---|---|---|
| 5,882,174 A * | 3/1999 | Woemer | ............... | B65G 60/00 414/788.7 |
| 2011/0286829 A1* | 11/2011 | Xu | ............... | B65G 59/02 414/796.7 |
| 2012/0076631 A1* | 3/2012 | Wang | ............... | B65G 57/302 414/792.7 |

* cited by examiner

SEPARATION MECHANISM AND FEEDING DEVICE FOR MATERIAL TRAY

RELATED APPLICATIONS

This application claims the benefit of priority to Chinese Patent Application No. 201810312511.5 filed on Apr. 9, 2018, which is hereby incorporated by reference in its entirety.

FIELD OF THE INVENTION

The present invention relates to a field of material conveying, and more particularly to a separation mechanism for separating stacked material tray and a feeding device for feeding the material tray.

BACKGROUND OF THE INVENTION

Commonly, in order to improve efficiency and save space, disc-shaped or sheet objects are often stacked together for storage and transport. In use, they must be separated from each other. Existing robots and suckers are often used to suck and transport discs, sheets, or things like that to separate and feed them, but their structures are complex and bulky. In use, they not only occupy too much space, but also need to control the movement of the sucker and the movement of the robot, and the control is complicated.

Thus, it's necessary to provide a separation mechanism that is small in size, simple in structure, and convenient to control.

SUMMARY OF THE INVENTION

One objective of the present invention is to provide a separation mechanism for separating stacked material trays, which is simple in structure, small in size, and convenient to control.

Another objective of the present invention is to provide a feeding device with a separation mechanism for separating stacked material trays and feeding the material tray, which is simple in structure, small in size, and convenient to control.

To achieve the above objective, a separation mechanism is provided, which includes a first frame structure, a clamping mechanism, a lifting assembly, and a second frame structure with a material area. The clamping mechanism includes a driving motor mounted on the first frame structure, two rotating shafts driven by the driving motor, and at least one clamping assembly arranged on the rotating shafts. A separation area is formed between the two rotating shafts and located above the material area. Each of the clamping assembly includes two main clamping portions located on left and right sides of the separation area, and each of the main clamping portions includes a main cam mounted on the respective rotating shaft and a main clamping block following the main cam. The two main cams respectively drive the two main clamping blocks to extend into and withdraw from the separation area. The rotating shafts rotate between an initial station and a clamping station. The main cams are configured that when the rotating shafts rotate to the initial station, the main cams drive the main clamping blocks to withdraw to release the material tray, and when the rotating shafts rotate to the clamping station, the main cams drive the main clamping blocks to extend to clamp the material tray. The lifting assembly controls relative movement of the clamping mechanism and the second frame structure.

In comparison with the prior art, the lifting assembly cooperating with the cams separates the material trays without clamping the material trays by a robot, and the clamping mechanism is located above the second frame structure, which effectively save space occupied by the separation mechanism. Only by controlling the rotating shaft, the clamping assembly extends into and withdraws from the separation area. The control is simple and easy to operate. In addition, the clamping mechanism clamps stably the material trays, which is less prone to operational errors.

Preferably, the clamping mechanism further includes a holding assembly, which includes two holding portions arranged respectively on the two rotating shafts and located on left and right sides of the separation area. Each of the holding portions includes a holding cam and a holding block following the holding cam. The two holding cams respectively drive the two holding blocks to extend into and withdraw from the separation area. The rotating shafts rotate between four stations. The holding cams are configured that when the rotating shafts rotate between the initial station and a holding station, the holding cams drive the holding blocks to extend to hold the material tray at the holding station, when the rotating shafts rotate between the holding station and an unloading station, the holding cams drive the holding blocks to withdraw to release the material tray at the unloading station, and when the rotating shafts rotate between the holding station and the clamping station, the main cams drive the main clamping blocks to extend to clamp the material tray before the holding blocks withdraw completely. Therefore, the material tray can be initially fixed by the holding assembly, and then the lifting assembly is lifted to separate the material trays, and then the material tray is clamped by the main clamping portion to facilitate subsequent operations.

Preferably, the number of the holding assembly is two, which are respectively located on both sides of the main clamping assembly, so that the material tray clamped is more stable.

Preferably, when the rotating shafts rotate from the unloading station to the initial station, the lifting assembly controls the second frame structure to approach the clamping mechanism, and moves the material tray on the top of the material area to the separation area at the initial station. When the rotating shafts rotate from the holding station to the clamping station, the lifting assembly controls the second frame structure to be away from the clamping mechanism, and the material tray at the top of the material area is separated from the second frame structure at the clamping station.

Preferably, the clamping mechanism further includes a subordinate clamping assembly. The subordinate clamping assembly includes a front clamping portion located on the front side of the separation area and a rear clamping portion located on the rear side of the separation area. The front clamping portion includes a front cam and a front clamping block, and the rear clamping portion includes a rear cam and a rear clamping block. Concretely, the front cam drives the front clamping block to extend towards or withdraw from the front edge of the separation area, and the rear cam drives the rear clamping block to extend out or withdraw from the rear edge of the separation area. The rotating shafts rotate between four stations. The front cam and the rear cam are configured that when the rotating shafts rotate to the initial station, the front cam and the rear cam respectively drive the front clamping block and the rear clamping block to withdraw to release the material tray, when the rotating shafts rotate between the initial station and the holding station, the front cam drives the front clamping block to extend to the front edge of the separation area, when the rotating shafts rotate between the holding station and the clamping station, the rear cam drives the rear clamping block to extend to the rear edge of the separation area to clamp the material tray, and when the rotating shafts rotate between the clamping station and the unloading station, the front cam and the rear cam drive the front clamping block and the rear clamping block to withdraw to release the material tray.

Preferably, the main clamping portion further includes a guiding element fixed to the first frame structure. The main clamping block is movably engaged with the guiding element and moved under the limitation of the guiding element.

Concretely, the guiding element is a first guide rail. The main clamping block is slidably engaged with the first guide rail. Preferably, the first guide rail of the main clamping assembly is horizontally disposed.

Preferably, a sliding groove is defined on the main clamping block for the material tray sliding. The sliding grooves of the two main clamping blocks form a sliding rail for the material tray sliding. After being clamped, the material tray can move and quickly be away from the separation area through the sliding groove.

Preferably, before the rotating shafts rotate to the initial station, the lifting assembly controls the second frame structure to approach the clamping mechanism, and moves the material tray on the top of the material area to the separation area at the initial station. After the rotating shafts rotate to the clamping station, the lifting assembly controls the second frame structure to be away from the clamping mechanism, and the material tray at the top of the material area is separated from the material area at the clamping station.

A feeding device is also provided, which includes a feeding box and a transfer mechanism, and an abovementioned separation mechanism. The separation mechanism is installed in the feeding box, and the separation area is located at an upper opening of the feeding box. The lifting assembly is connected with the second frame structure and controls the second frame structure to lift or fall, then to drive the clamping mechanism and the second frame structure to move relative to each other. A sliding groove is defined on the main clamping block for the material tray sliding, and the sliding grooves of the two main clamping blocks are opposite to form a sliding rail for the material tray sliding.

In comparison with the prior art, the lifting assembly cooperating with the cams separates the material trays without clamping the material trays by a robot, and the clamping mechanism is located above the second frame structure, which effectively save space occupied by the separation mechanism. Only by controlling the rotating shaft, the clamping assembly extends into and withdraws from the separation area. In addition, the clamping assembly clamps stably the material trays, which is less prone to operational errors. Furthermore, the second frame structure for storing the stacked material trays, the clamping mechanism for clamping the material tray, and the transfer mechanism for transferring the material tray are placed in the feeding box, and the structure is simple.

Preferably, the feeding device further includes a stacking assembly, which includes a stacking table, a lifting mechanism, and a second guide rail communicating with the sliding rail on the stacking table. The stacking table is provided with a guide rail communicating with the sliding rail, the transfer mechanism drives the material tray to move along the sliding rail to the stacking table, and the lifting mechanism lifts the material tray on the stacking table.

Preferably, the lifting mechanism includes a drive mechanism and an ejecting block. Concretely, the drive mechanism is arranged under the stacking table, and the ejecting blocks are positioned on both sides of the stacking table. When the lifting mechanism operates, the ejecting block is lifted up to eject the material tray on the stacking table.

Preferably, the feeding device further includes a storage box, which has a material transfer track communicated with the second frame structure. The material transfer track carries the stacked material trays and conveys them to the second frame structure.

Preferably, the stacking table is located at the top of the storage box, thereby effectively saving space.

Preferably, the transfer mechanism includes switching blocks installed on the first frame structure and located on front and rear sides of the separation area. The switching blocks rotate to toggle the material tray to slide along the sliding rail. Preferably, the transfer mechanism has a simple structure and a small volume.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings.

Figure 1:
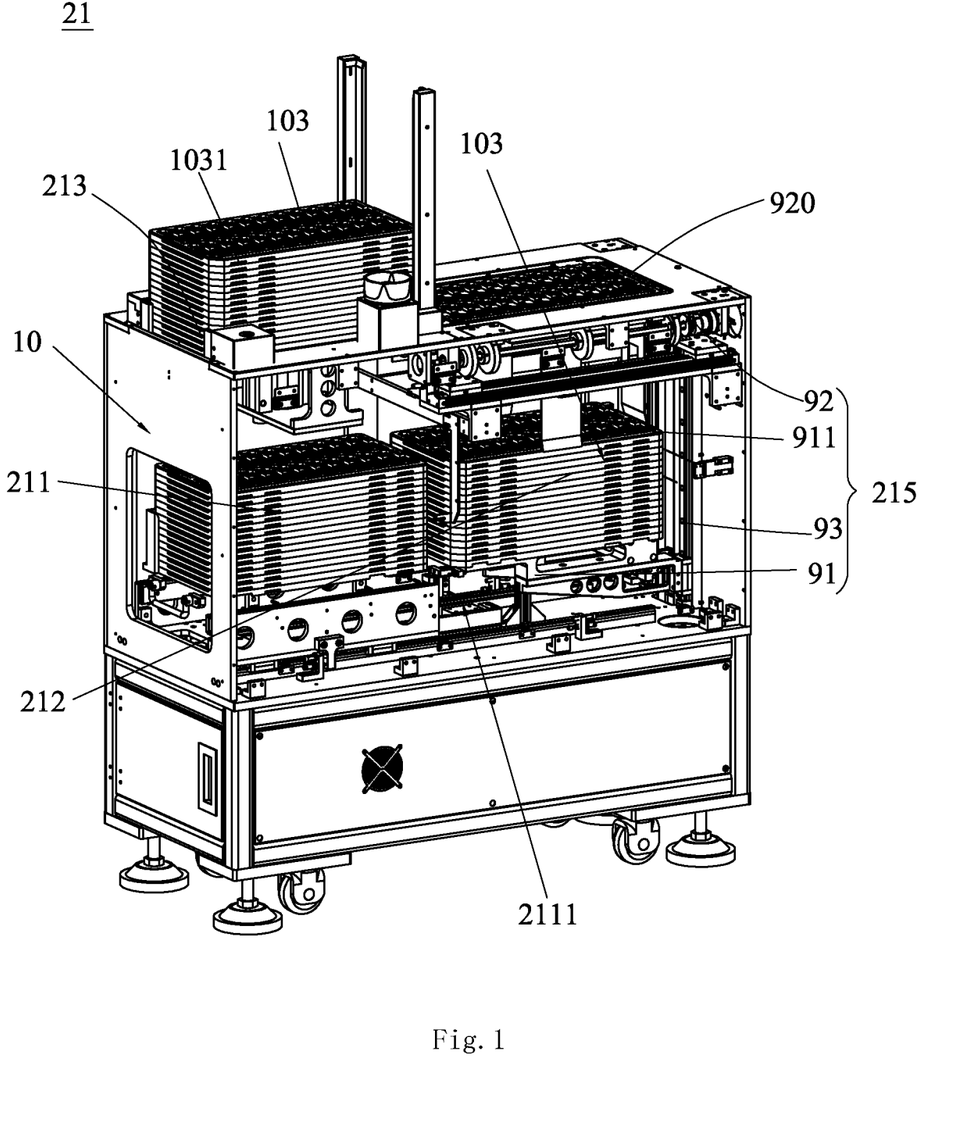
FIG. 1 is a perspective view of a feeding device according to the present invention.
Figure 2:
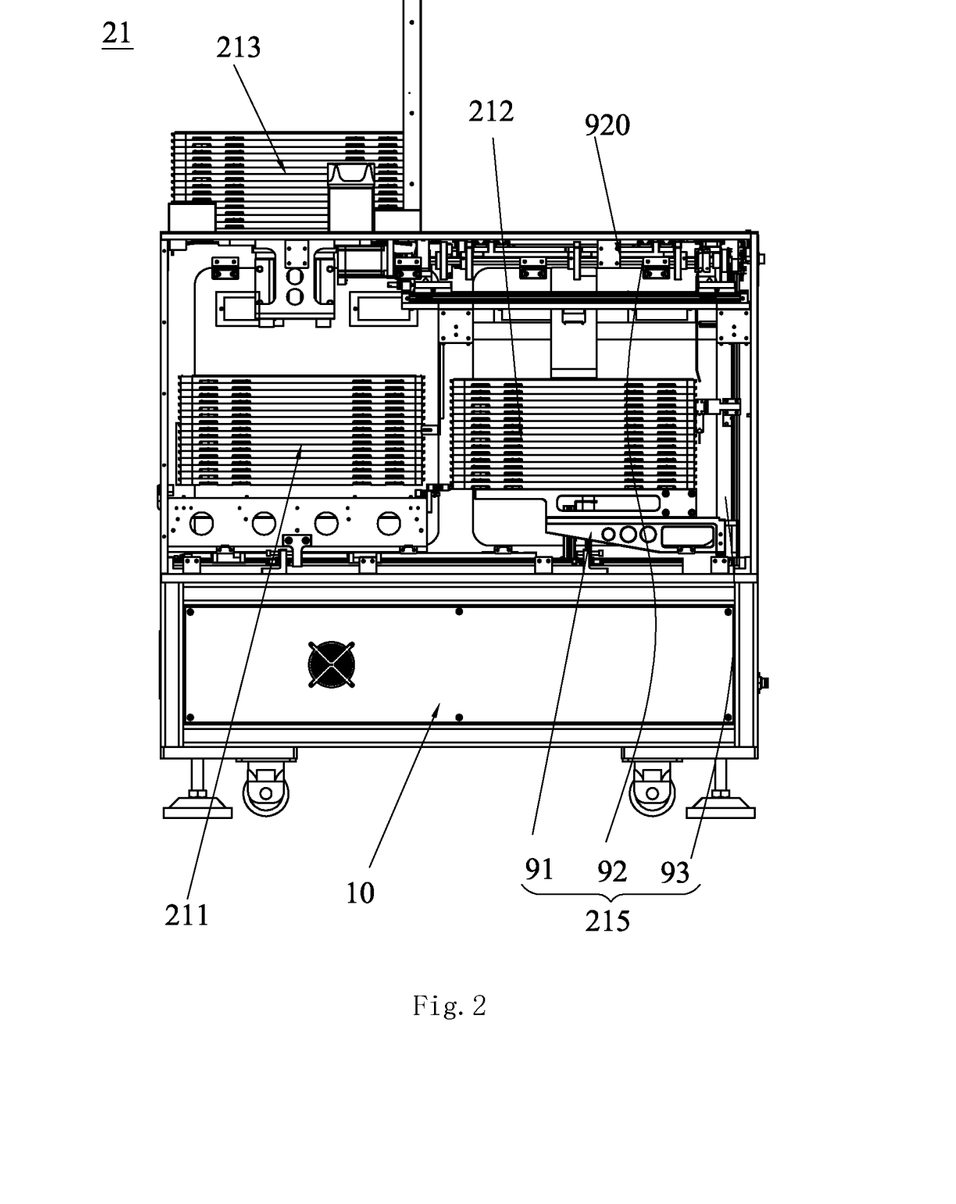
FIG. 2 is a side view of the feeding device according to the present invention.
Figure 6:
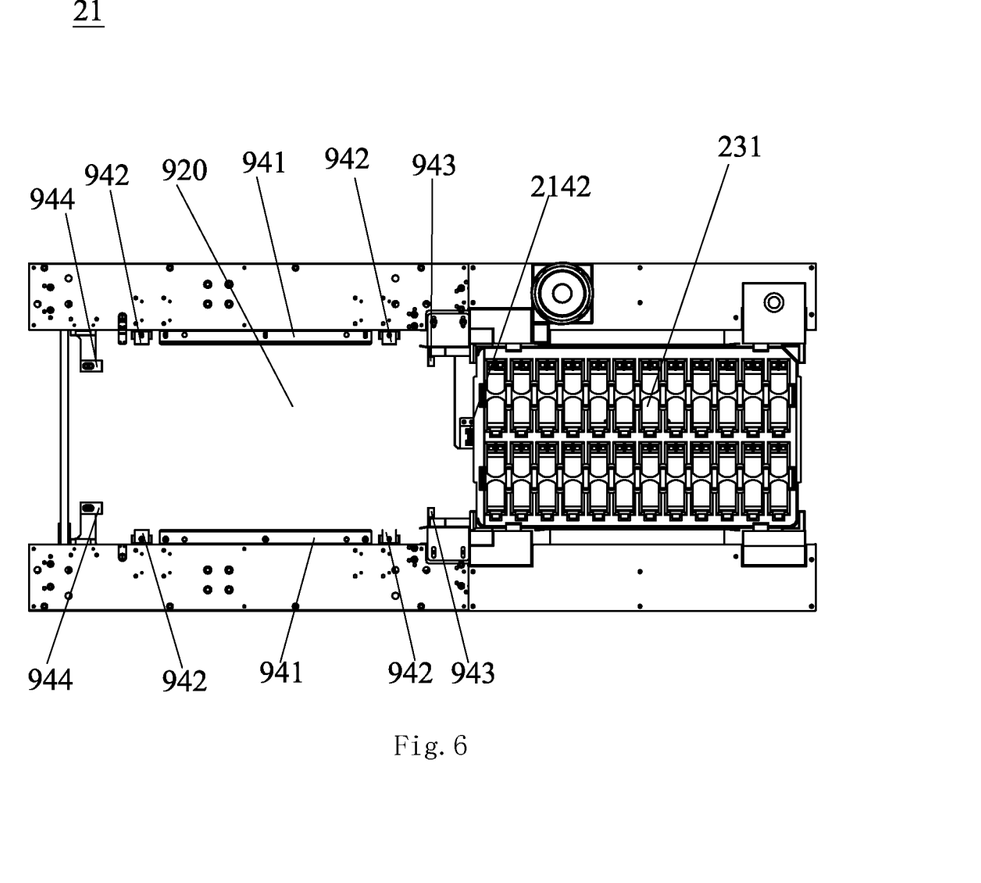
FIGS. 6-9 are a top view illustrating the clamping mechanism in its four stations according to the present invention.

Referring to FIGS. 1 and 2, a feeding device 21 for feeding material tray to a production line, includes a feeding box 212 and a transfer mechanism (2141, 2142) (as shown in FIG. 6). The separation mechanism 215 is installed in the feeding box 212.

Referring to FIGS. 1 and 2, the separation mechanism 215 is provided, which includes a clamping mechanism 92, a lifting assembly 93, and a second frame structure 91 with a material area 911. The clamping mechanism 92 is located at an upper opening of the feeding box 212. The clamping mechanism 92 cooperating with the lifting assembly 93 separates the stacked material tray 103 on the second frame structure 91 in the feeding box 212. In this embodiment, the material tray 103 is used for holding material. Therefore, the clamping mechanism 92 above the feeding box 212 is also formed with a feeding area. The conveying mechanism on the production line can directly take material from the feeding area. After taking the material, the material tray 103 can be removed from the clamping mechanism 92 by the transfer mechanism (2141, 2142).

Figure 4:
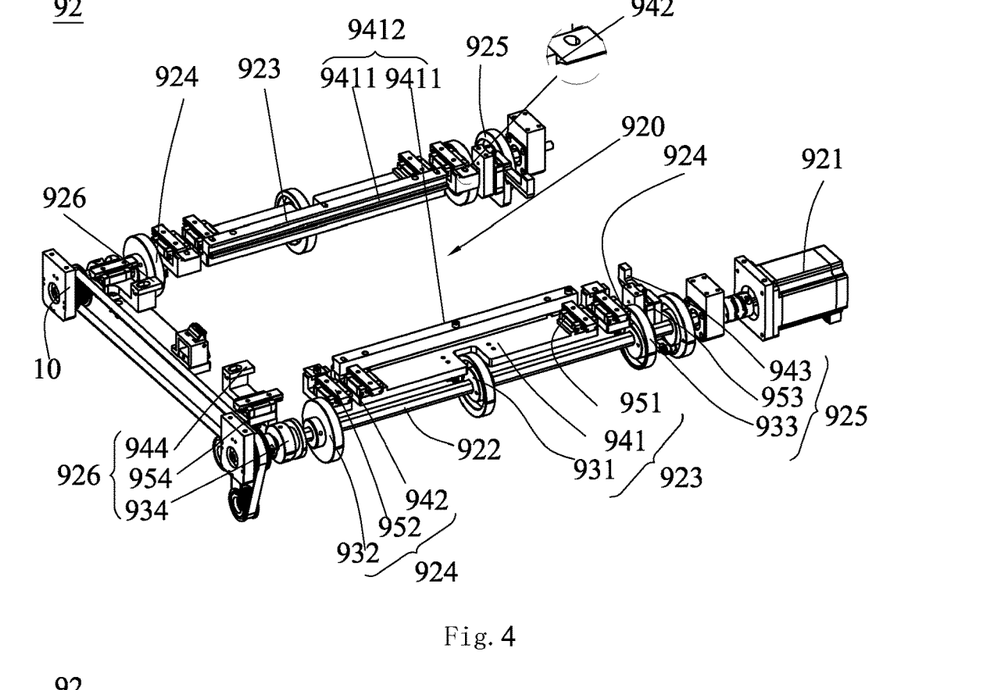
FIG. 4 is a perspective view of a clamping mechanism according to the present invention.
Figure 5:
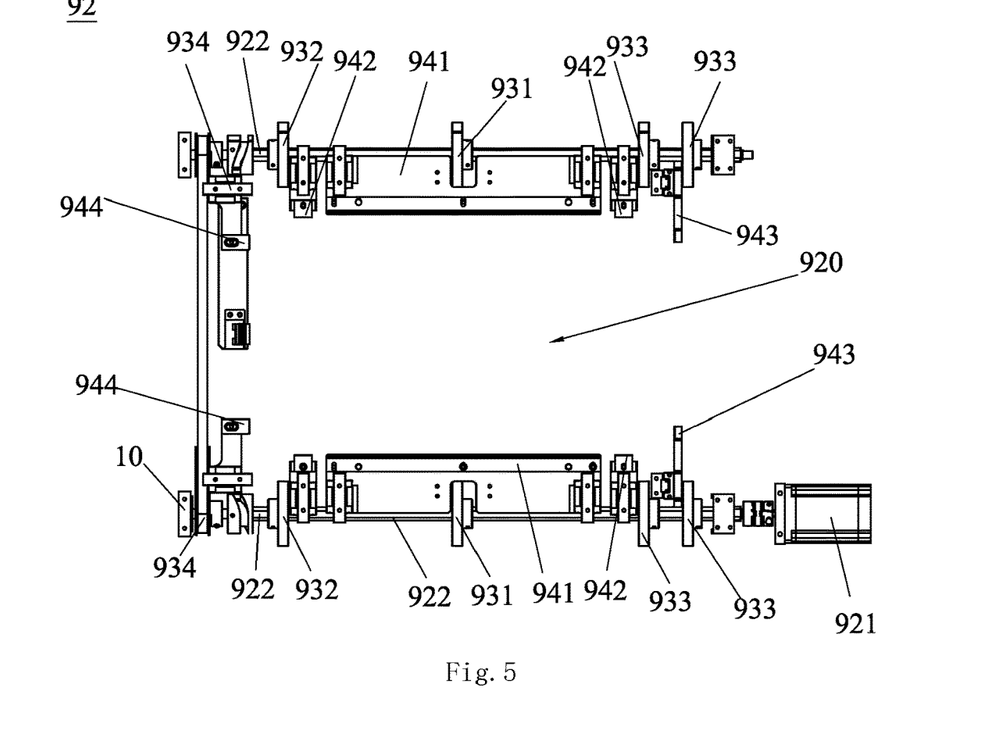
FIG. 5 is a bottom plan view of the clamping mechanism according to the present invention.

Referring to FIGS. 4 and 5, the clamping mechanism 92 includes a driving motor 921 mounted on the first frame structure 10, two rotating shafts 922 driven by the driving motor 921, and the two main clamping portions 923 respectively mounted on the two rotating shafts 922. A separation area 920 is formed between the two rotating shafts 922 and located above the material area 911. The main clamping portion 923 includes a main cam 931, a main clamping block 941, and a first guide rail 951. The main cam 931 is mounted on the rotating shaft 922, the main clamping block 941 follows the main cam 931, and the first guide rail 951 is horizontally disposed and connected to the first frame structure 10. The two rotating shafts 922 respectively drive the two main cams 931 to rotate. The main clamping block 941 is slidably connected to the first guide rail 951. The main cam 931 drives the main clamping block 941 to extend into or withdraw from the separation area 920 to clamp or release the material tray 103. The rotating shaft 922 is sequentially provided with an initial station and a clamp station on rotational position thereof. As shown in FIG. 6, when the rotating shafts 922 rotate to the initial station, the main cams 931 drive the main clamping blocks 941 to withdraw to release the material tray 103. When the rotating shafts 922 rotate between the initial station and the clamping station, the main cams 931 drive the main clamping blocks 941 to extend out at the clamping station. Or, the rotating shaft 922 rotates between the clamping station and the initial station, the main cams 931 drive the main clamping block 941 to withdraw at the initial station. Specifically, the driving motor 921 is a stepping motor. Of course, the lifting assembly 93 may also be connected to the clamping mechanism 92, and the clamping mechanism 92 is controlled to lift and lower to separate relatively the clamping mechanism 92 and the second frame structure 91.

In this embodiment, the lifting assembly 93 is connected to the second frame structure 91 for lifting or lowering the second frame structure 91, so that the clamping mechanism 92 and the second frame structure 91 move relative to each other.

Preferably, as shown in FIG. 4, a sliding groove 9411 is defined on the main clamping block 941 for the material tray 103 sliding. The sliding grooves 9411 of the two main clamping blocks form a sliding rail 9412 for the material tray 103 sliding. In this embodiment, cross-section of the sliding groove 9411 is "U" shaped.

Of course, the first guide rail 951 of the main clamping portion 923 uses other guiding element, such as an inclined curved track. Or the guiding element may be removed, and the main clamping block 941 is directly configured on the main cam 931. Alternatively, the guiding element is connected to the main cam 931 by a spring member. At this time, cross section of the sliding groove 9411 is "L" shaped.

Specifically, the lifting assembly 93 controls the second frame structure 91 to rise before reaching the initial station, so that the material tray 103 on the top of the material area 911 is moved to the separation area 920 at the initial station; after the clamping station, the second frame structure 91 descends, thereby separating the material tray 103 on the top of the material area 911 from the second frame structure 91.

Figure 3:
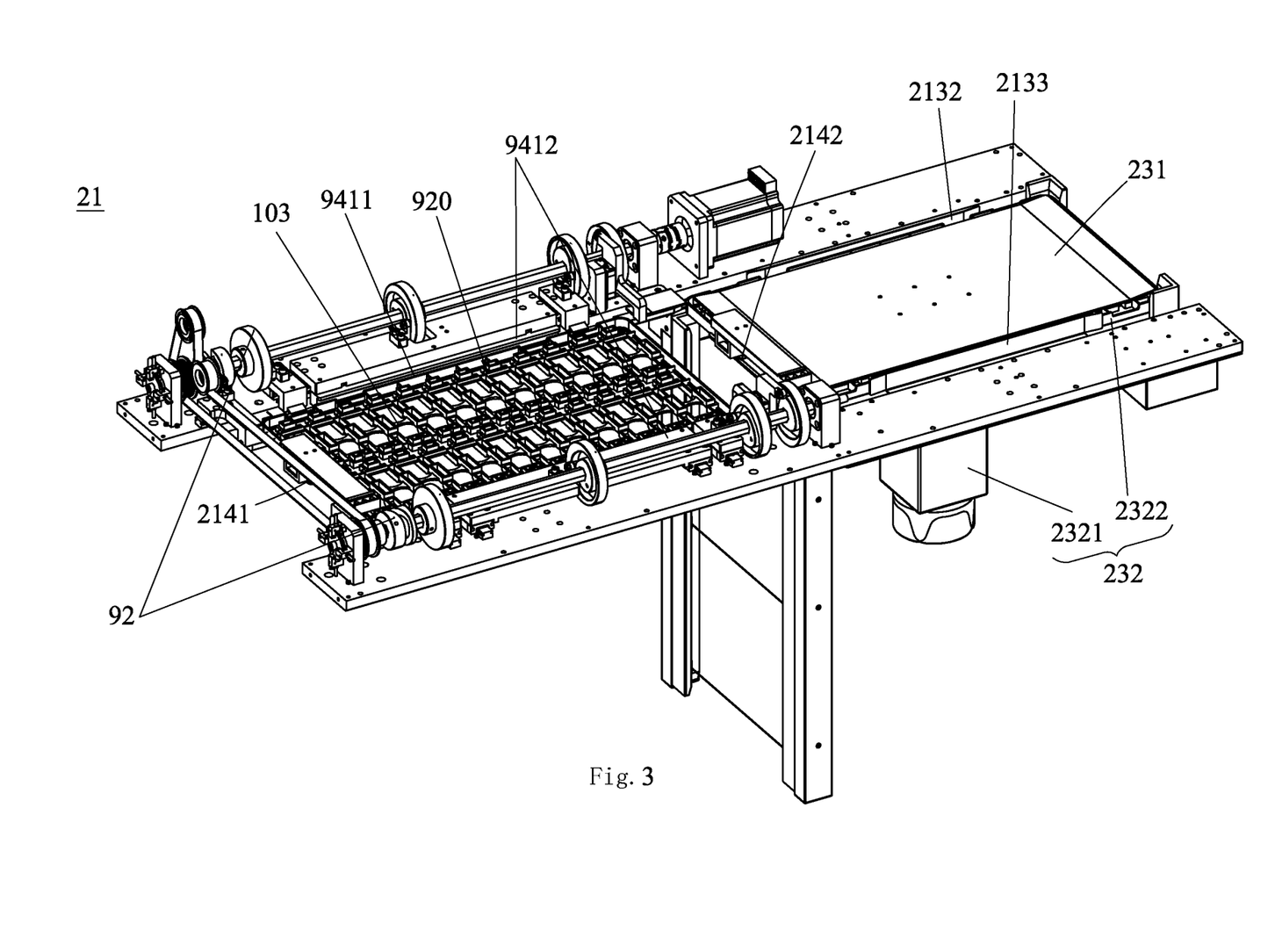
FIG. 3 is a partial perspective view of the feeding device according to the present invention.

Referring to FIGS. 1-3, the feeding device 21 further includes a stacking assembly 213, which includes a stacking table 231, a lifting mechanism 232, and a second guide rail communicating with the sliding rail 9412. The second guide rail is formed by the bottom surface of the stacking table 231 and two side walls 2132 and 2133. The transfer mechanism (2141, 2142) is located at an upper opening of the feeding box 212 and drives the material tray 103 on the sliding rail 9412 to move along the sliding rail 9412 to the stacking table 231. The lifting mechanism 232 includes a drive mechanism 2321 and an ejecting block 2322. The ejecting blocks 2322 are positioned on both sides of the stacking table 231 and face edge of the material tray 103. When the transfer mechanism (2141, 2142) operates, the ejecting block 2322 lifts up the material body 103 on the stacking table 231.

Preferably, as shown in FIG. 1, the feeding device 21 further includes a storage box 211, and a material transfer track 2111 communicated with the second frame structure 91 is installed in the storage box 211. The material transfer track 2111 carries the stacked material trays 103 and conveys them to the second frame structure 91. The stacking table 231 is located at the top of the storage box 211.

Referring to FIGS. 3 and 4, the transfer mechanism (2141, 2142) includes a switching block (2141, 2142) rotatably installed on the first frame structure 10 and located on front and rear sides of the separation area 920. The switching block rotates and toggles the material tray 103 to slide along the sliding rail 9412 until the material tray 103 is separated from the separation area 920 and enters the stacking table 231.

Referring to FIGS. 3-5, the clamping mechanism 92 further includes a holding assembly, which includes two holding portions 924 respectively mounted on the two rotating shafts 922. The holding portion 924 includes a holding cam 932, a holding block 942, and a third guide rail 952. Specifically, the holding cam 932 is mounted on the rotating shaft 922, the holding block 942 follows the holding cam 932, and the third guide rail 952 is connected to the first frame structure 10 and horizontally arranged. The two rotating shafts 922 respectively drive the two holding cams 932 to rotate, and the holding cam 932 is slidably connected to the third guide rail 952. The holding cam 932 drives the holding block 942 to extend into and withdraw from the separation area 920 to clamp and release the material tray 103.

An alignment groove 1031 is formed on the left and right sides of the material tray 103. The holding block 942 cooperates with the alignment groove 1031 and inserts into the alignment groove 1031, to hold the material tray 103. Preferably, the holding block 942 is wedge-shaped.

The rotating shaft 922 rotates between four stations, namely an initial station, a holding station, a clamping station, and an unloading station along the rotation position of the rotating shaft 922. At the initial station, the holding block 942 withdraws, thereby the holding portion 924 releasing. When the rotating shaft 922 rotates between the initial station and the holding station, the holding cam 932 drives the holding block 942 to extend to hold the material tray 103 at the holding station. Also, the rotating shaft 922 rotates between the holding station and the unloading station, the holding cam 932 drives the holding block 942 to withdraw to release the material tray 103 at the unloading station. Further, the rotating shaft 922 rotates between the holding station and the clamping station, the main cam drives the main clamping block 941 to extend to clamp the material tray 103 before the holding block 942 withdraw completely.

Preferably, the number of the holding portions 924 is four. Two holding portions 924 are in a group and located on the front and rear sides of the main clamping portion 923.

Of course, the third guide rail 952 of the holding portion 924 also uses other guiding element, such as an inclined curved track. Or the guiding element may be removed, and the holding block 942 is directly formed on the holding cam 932. Alternatively, the guiding element is connected to the holding cam 932 by a spring member.

The lifting assembly 93 controls the material first frame structure 91 to rise at the initial station, so that the material tray 103 on the top of the material area 911 is moved to the separation area 920. The second frame structure 91 descends at the holding station, thereby separating the material tray 103 on the top of the material area 911 from the second frame structure 91.

Referring to FIGS. 3-5, the clamping mechanism 92 further includes a subordinate clamping assembly (925, 926). The subordinate clamping assembly includes a front clamping portion 925 and a rear clamping portion 926. Specifically, the front clamping portion 925 is located on the front side of the separation area 920, and the rear clamping portion 926 is located on the rear side of the separation area 920. The front clamping portion 925 includes a front cam 933, a front clamping block 943, and a fourth guide rail 953. Specifically, the front cam 933 is mounted on the rotating shaft 922, the front clamping block 943 follows the front cam 933, and the fourth guide rail 953 is connected to the first frame structure 10 and vertically arranged. The two rotating shafts 922 respectively drive the two front cams 933 to rotate, and the front cam 933 is slidably connected to the fourth guide rail 953. The front cam 933 drives the front clamping block 943 to extend out and withdraw from the front edge of the separation area 920. The rear clamping portion 926 includes a rear cam 934, a rear clamping block 944, and a fifth guide rail 954. Specifically, the rear cam 934 is mounted on the rotating shaft 922, the rear clamping block 944 follows the rear cam 934, and the fifth guide rail 954 is connected to the first frame structure 10 and vertically arranged. The two rotating shafts 922 respectively drive the two rear cams 934 to rotate, and the rear cams 934 are slidably connected to the fifth guide rail 954. The rear cam 934 drives the rear clamping block 944 to extend out and withdraw from the rear edge of the separation area 920. The front cam 933 and the rear cam 934 drive respectively the front clamping block 943 and the rear clamping block 944 to extend out or withdraw.

Specifically, the number of the front clamping portion 925 is two, and the two front clamping portion 925 are mounted on the rotating shaft 922; the number of the rear clamping portion 926 is two, and the two rear clamping portion 926 are mounted on the rotating shaft 922.

In this embodiment, the rotating shaft 922 rotates between four stations. When the rotating shafts 922 rotate to the initial station, the front cam 933 and the rear cam 934 drive respectively the front clamping block 943 and the rear clamping block 944 to withdraw to release the material tray 103. When the rotating shafts 922 rotate between the initial station and the holding station, the front cam 933 drives the front clamping block 943 to extend to the front edge of the separation area 920. When the rotating shafts 922 rotate between the holding station and the clamping station, the rear cam 934 drives the rear clamping block 944 to extend to the rear edge of the separation area 920 to clamp the material tray 103. When the rotating shafts 922 rotate between the clamping station and the unloading station, the front cam 933 and the rear cam 934 drive the front clamping block 943 and the rear clamping block 944 to withdraw to release the material tray 103.

Of course, the fourth guide rail 953 also uses other guiding element, such as an inclined curved track. Or the guiding element may be removed, and the holding block 942 is directly formed on the holding cam 932. Besides, the fourth guide rail 953 is not limited to the vertical arrangement.

Referring to FIG. 6 to FIG. 9, the feeding device 21 according to this embodiment above at four stations is schematically illustrated, as follows:

(1) Referring to FIG. 6, the clamping mechanism 92 is in an initial state, the main clamping block 941, the holding block 942, the front clamping block 943, and the rear clamping block 944 withdraw from the separation area 920, and the main clamping portion 923, the holding portion 924 and the subordinate clamping assembly (925, 926) are in a released state.

The lifting assembly 93 lifts the second frame structure 91, so that the material tray 103 on the top of the material area 911 moves upward to the separation area 920.

Figure 7:
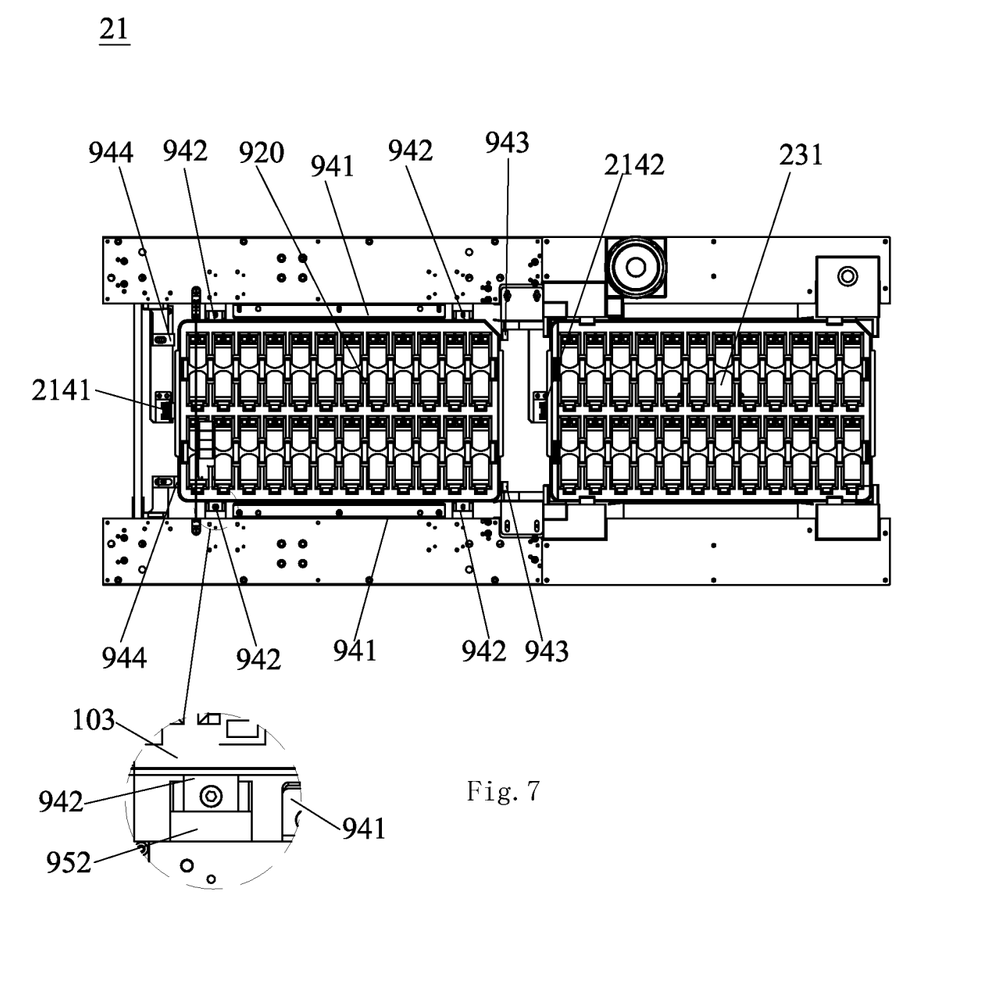

(2) The rotating shaft 922 rotates, and the holding cam 932 drives the holding block 942 to extend into the separation area 920. When the rotating shaft 922 rotates 90 degrees from the initial position, the holding blocks 942 on the left and right sides of the separation area 920 are respectively inserted into the alignment grooves 1031 on both sides of the material tray 103. And the holding portions 924 hold the material tray 103 from the left and right sides of the material tray 103 (as shown in FIG. 7). The front cam 933 drives the front clamping block 943 to extend upwards to the front edge of the separation area 920, (as shown in FIG. 7). At this time, the front clamping block 943 is close to or contacts the front side of the material tray 103. It is at the holding station at this time.

The lifting assembly 93 drives the second frame structure 91 to descend, so that the material tray 103 on the top of the second frame structure 91 are separated from other material trays. The separated material tray 103 is held on the holding block 942.

Figure 8:
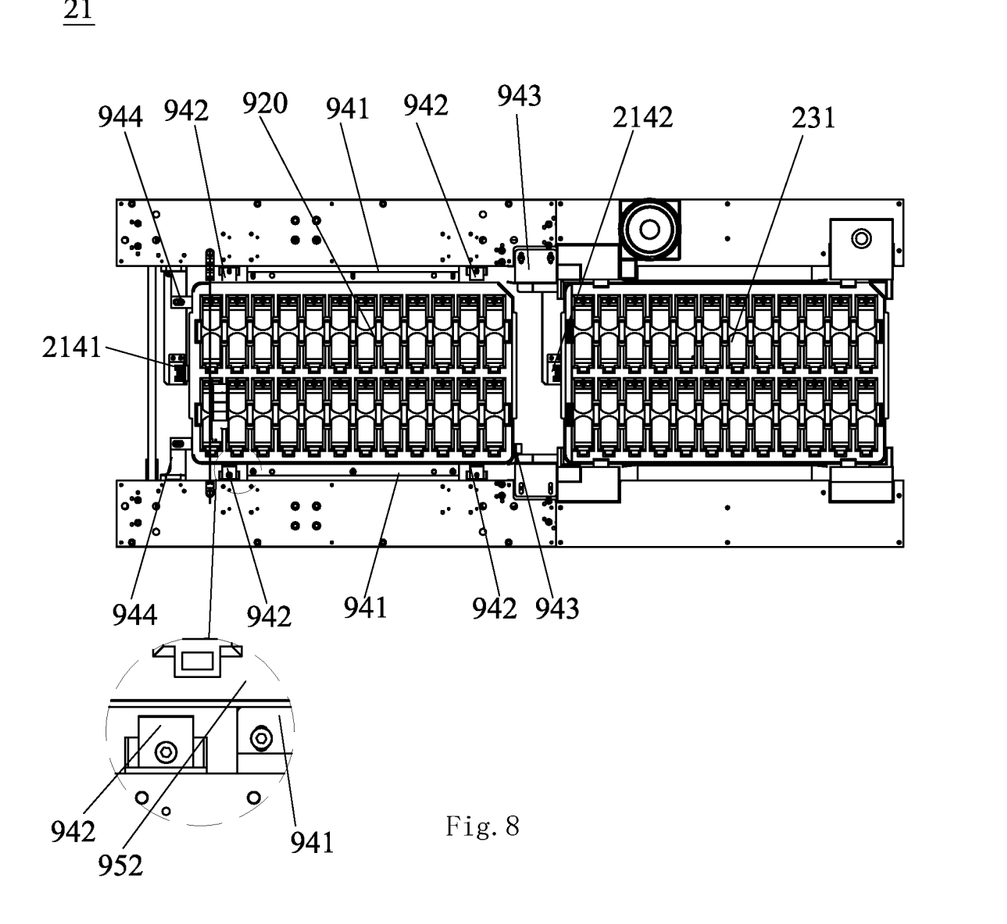

(3) The rotating shaft 922 continues to rotate, and the rear cam 934 rotates to drive the rear clamping block 944 to extend to the rear edge of the separation area 920. Then the rear clamping block 94 pushes the material tray 103 to touch the front clamping block 943, and the subordinate clamping assembly (925, 926) clamps the material tray 103. At the same time, the main cam 931 drives the main clamping blocks 941 to extend into the separation area 920 and to insert into the material tray 103. So the material tray 103 is positioned and slidably fits with the sliding rail 9412. After the material tray 103 is positioned, the rotating shaft 922 continues to rotate. The holding cam 932 drives the holding block 942 to withdraw. When the rotating shaft 922 rotates 180 degrees from the initial position, the holding blocks 942 respectively exit from the alignment groove 1031 to release the material tray 103 (as shown in FIG. 8). It is at the clamping station at this time.

(4) A feeding mechanism feeds material for the material tray 103.

Figure 9:
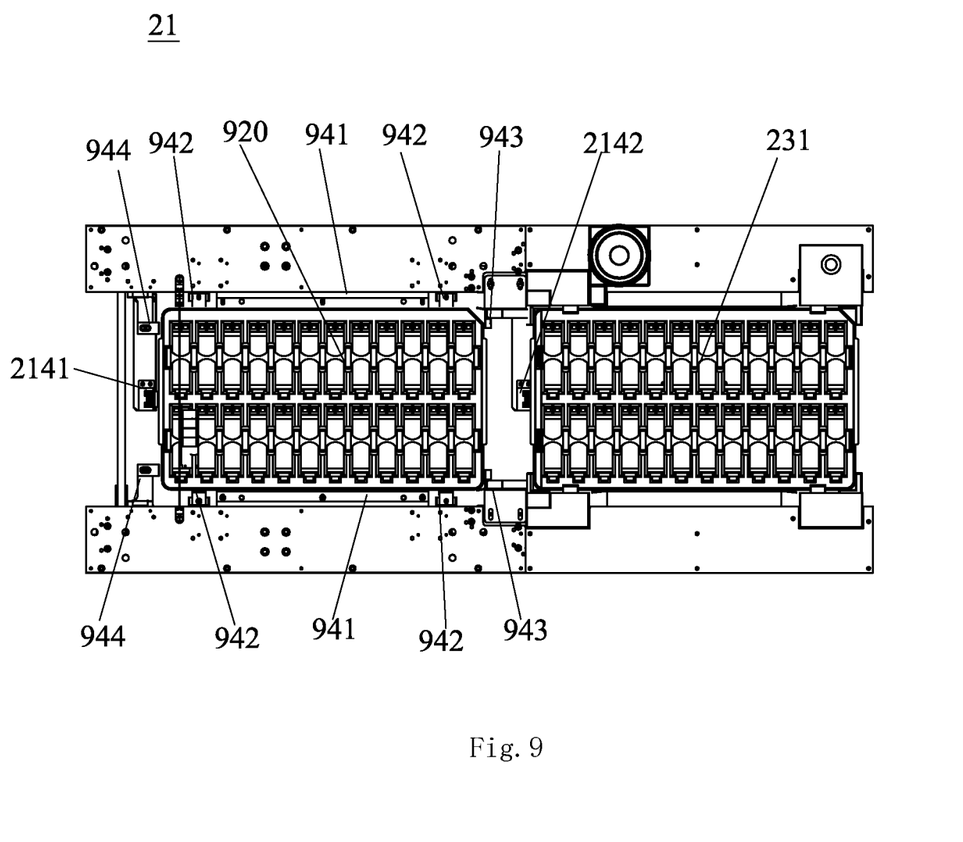

(5) After one material tray 103 finishes loading, the rotating shaft 922 continues to rotate. The front cam 933 drives the front clamping block 943 to withdraw (as shown in FIG. 9). At this time, the front clamping block 943 leaves the front side of the material tray 103, and the rear cam 934 drives the rear clamping block 934 to be away from the rear side of the material tray 103. When the rotating shaft 922 rotates 270 degrees from the initial position, the subordinate clamping assembly (925, 926) is in a released state. It is at the unloading station at this time.

(6) The switching blocks rotate back and forth to toggle the material tray 103 to slide along the sliding rail 9412 until it is separated from the separation area 920 and enters the stacking table 231. After the material tray 103 is separated from the separation area 920, the rotating shaft 922 continues to rotate. The main cam 931 drives the main clamping block 941 to withdraw from the separation area 920. The main clamping portion 923 is in the released state, and it is at the initial station (as shown in FIG. 6).

In the above, the rotating shaft 922 is provided with four stations, and each 90 degrees has a station. Of course, rotation angle of each station is not limited to 90 degrees, and it can be other angles.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A separation mechanism, for separating stacked material trays, comprising:
   a first frame structure;
   a second frame structure with a material area for holding stacked material trays;
   a clamping mechanism, comprising a driving motor mounted on the first frame structure, two rotating shafts driven by the driving motor, and a clamping assembly arranged on the rotating shafts, a separation area being formed between the two rotating shafts and located above the material area, the clamping assembly comprising two main clamping portions located on left and right sides of the separation area, each of the main clamping portions comprising a main cam mounted on the respective rotating shaft and a main clamping block following the main cam, the two main cams respectively driving the two main clamping blocks to extend into and withdraw from the separation area, the rotating shafts rotating between an initial station and a clamping station, and the main cams being configured that when the rotating shafts rotate to the initial station, the main cams drive the main clamping blocks to withdraw to release the material tray, and when the rotating shafts rotate to the clamping station, the main cams drive the main clamping blocks to extend to clamp the material tray;
   a lifting assembly controlling relative movement of the clamping mechanism and the second frame structure; and
   each of the main clamping portions further comprising a guiding element fixed to the first frame structure, and each of the main clamping blocks being movably engaged with the guiding element and moved under the limitation of the guiding element.

2. The separation mechanism according to claim 1, wherein the clamping mechanism further comprises a holding assembly, which comprises two holding portions arranged respectively on the two rotating shafts and located on left and right sides of the separation area, each of the holding portions comprises a holding cam and a holding block following the holding cam, the two holding cams respectively drive the two holding blocks to extend into and withdraw from the separation area, the rotating shafts rotate between four stations, the holding cams are configured that when the rotating shafts rotate between the initial station and a holding station, the holding cams drive the holding blocks to extend to hold the material tray at the holding station, when the rotating shafts rotate between the holding station and an unloading station, the holding cams drive the holding blocks to withdraw to release the material tray at the unloading station, and when the rotating shafts rotate between the holding station and the clamping station, the main cams drive the main clamping blocks to extend to clamp the material tray before the holding blocks withdraw completely.

3. The separation mechanism according to claim 2, wherein when the rotating shafts rotate from the unloading station to the initial station, the lifting assembly controls the second frame structure to approach the clamping mechanism, and moves the material tray on the top of the material area to the separation area at the initial station; when the rotating shafts rotate from the holding station to the clamping station, the lifting assembly controls the second frame structure to be away from the clamping mechanism, and the material tray at the top of the material area is separated from the second frame structure at the clamping station.

4. The separation mechanism according to claim 1, wherein the clamping mechanism further comprises a subordinate clamping assembly, the subordinate clamping assembly comprises a front clamping portion located on the front side of the separation area and a rear clamping portion located on the rear side of the separation area; the front clamping portion comprises a front cam and a front clamping block, the rear clamping portion comprises a rear cam and a rear clamping block; the front cam drives the front clamping block to extend out or withdraw from the front edge of the separation area, and the rear cam drives the rear clamping block to extend out or withdraw from the rear edge of the separation area; and the rotating shafts rotate between four stations, the front cam and the rear cam are configured that when the rotating shafts rotate to the initial station, the front cam and the rear cam respectively drive the front clamping block and the rear clamping block to withdraw to release the material tray, when the rotating shafts rotate between the initial station and the holding station, the front cam drives the front clamping block to extend to the front edge of the separation area, when the rotating shafts rotate between the holding station and the clamping station, the rear cam drives the rear clamping block to extend to the rear edge of the separation area to clamp the material tray, and when the rotating shafts rotate between the clamping station and the unloading station, the front cam and the rear cam drive the front clamping block and the rear clamping block to withdraw to release the material tray.

5. The separation mechanism according to claim 1, wherein the guiding element is a first guide rail horizontally disposed, and the main clamping block is slidably engaged with the first guide rail.

6. The separation mechanism according to claim 1, wherein a sliding groove is defined on the main clamping block for the material tray sliding, and the sliding grooves of the two main clamping blocks form a sliding rail for the material tray sliding.

7. A feeding device, comprising a feeding box, a transfer mechanism, and a separation mechanism according to claim 1, the separation mechanism being installed in the feeding box, the separation area being located at an upper opening of the feeding box, the lifting assembly being connected with the second frame structure and controlling the second frame structure to lift and drive the second frame structure and the clamping mechanism to move relative to each other, a sliding groove is defined on the main clamping block for the material tray sliding, and the sliding grooves of the two main clamping blocks are opposite to form a sliding rail for the material tray sliding.

8. The feeding device according to claim 7, further comprising a stacking assembly comprising a stacking table, a lifting mechanism, and a second guide rail communicating with the sliding rail on the stacking table, the transfer mechanism driving the material tray to move along the sliding rail to the stacking table, and the lifting mechanism lifting the material tray on the stacking table.

\* \* \* \* \*